(12) United States Patent
Kagami et al.

(10) Patent No.: US 7,398,591 B2
(45) Date of Patent: Jul. 15, 2008

(54) MANUFACTURING METHOD OF A THIN-FILM MAGNETIC HEAD

(75) Inventors: Takeo Kagami, Tokyo (JP); Takayasu Kanaya, Tokyo (JP); Noriaki Kasahara, Tokyo (JP); Kazuki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 659 days.

(21) Appl. No.: 10/971,113

(22) Filed: Oct. 25, 2004

(65) Prior Publication Data

US 2006/0067010 A1    Mar. 30, 2006

(30) Foreign Application Priority Data

Oct. 30, 2003  (JP) ............................. 2003-370524

(51) Int. Cl.
*G11B 5/127* (2006.01)
*H04R 31/00* (2006.01)

(52) U.S. Cl. .............. 29/603.16; 29/603.13; 29/603.15; 29/603.18; 205/199; 205/122; 216/62; 216/66; 216/67; 360/122; 360/317; 451/5; 451/41

(58) Field of Classification Search . 29/603.13–603.16, 29/603.18; 205/119, 122; 216/62, 66, 67; 360/126, 317; 427/127, 128; 451/5, 41
See application file for complete search history.

(56) References Cited

U.S. PATENT DOCUMENTS

| 5,277,991 | A | 1/1994 | Satomi et al. |
| 5,341,118 | A | 8/1994 | Parkin et al. |
| 5,700,588 | A | 12/1997 | Saito et al. |
| 6,289,578 | B1 * | 9/2001 | Kamijima ................ 29/603.14 |
| 6,296,776 | B1 * | 10/2001 | Sasaki ......................... 216/22 |
| 6,329,211 | B1 * | 12/2001 | Terunuma et al. .............. 438/3 |

FOREIGN PATENT DOCUMENTS

JP        5-275769       10/1993

* cited by examiner

*Primary Examiner*—Paul D Kim
(74) *Attorney, Agent, or Firm*—Oblon, Spivak, McClelland, Maier & Neustadt, P.C.

(57) ABSTRACT

The present invention relates to a manufacturing method of a thin-film magnetic head whereby re-deposition and an overlapped part in a region of a magnetoresistive effect multilayered structure opposite to an air bearing surface can be removed and also a width of a free layer can be narrowed.

6 Claims, 6 Drawing Sheets

PRIOR ART
Fig. 1a
PRIOR ART
Fig. 1b
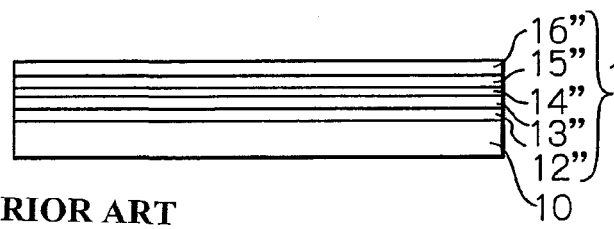
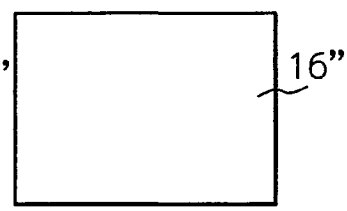
PRIOR ART
Fig. 1c
PRIOR ART
Fig. 1d
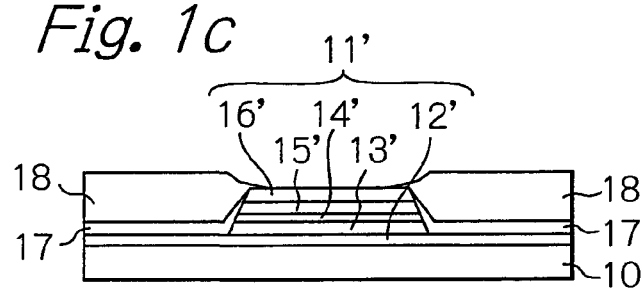
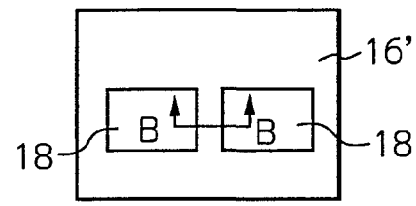
PRIOR ART
Fig. 1e
PRIOR ART
Fig. 1f
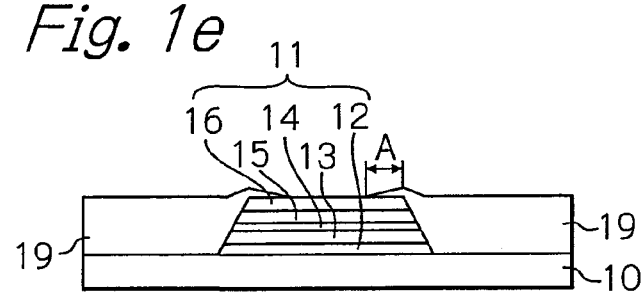
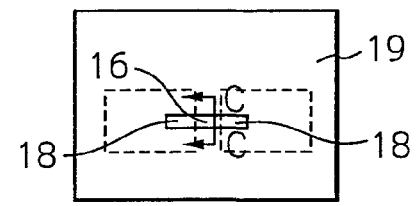
PRIOR ART
Fig. 1g
PRIOR ART
Fig. 1h
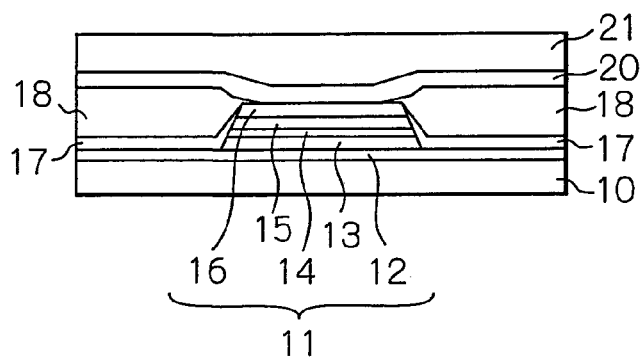
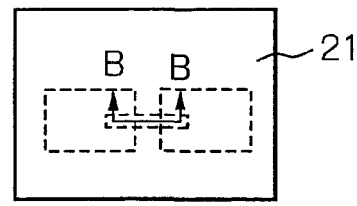

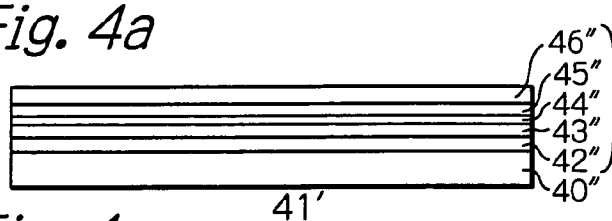
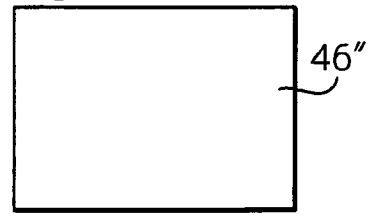
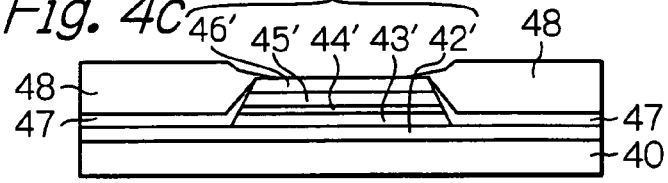
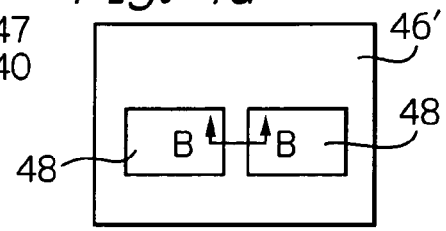
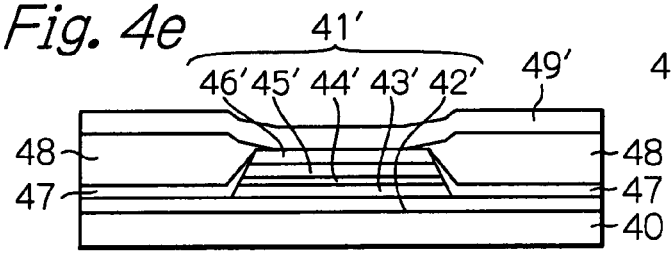
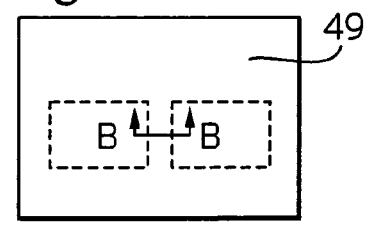
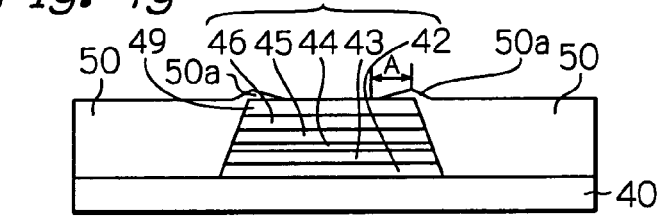
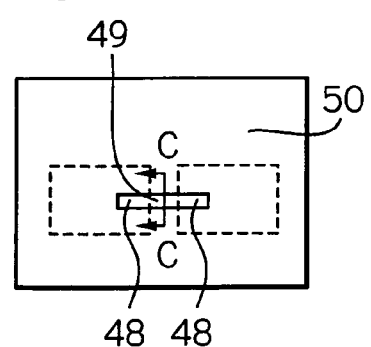
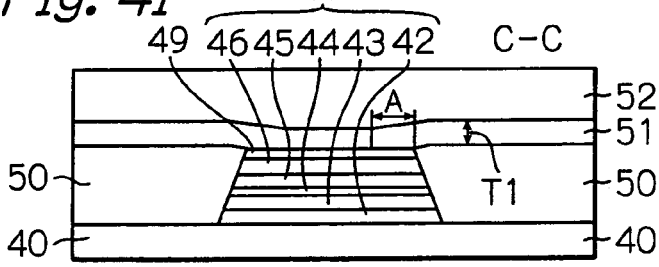
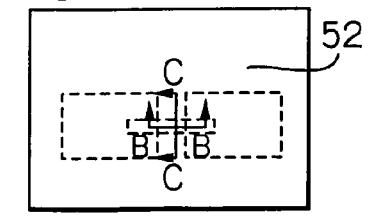
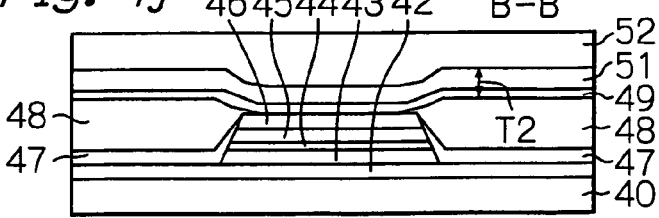

MANUFACTURING METHOD OF A THIN-FILM MAGNETIC HEAD

PRIORITY CLAIM

This application claims priority from Japanese patent application No. 2003-370524, filed on Oct. 30, 2003, which is incorporated herein by reference.

FIELD OF THE INVENTION

The present invention relates to a manufacturing method of a thin-film magnetic head with a magnetoresistive effect (MR) element for detecting magnetic intensity in a magnetic recording medium and for outputting a read signal, and to a thin-film magnetic head.

DESCRIPTION OF THE RELATED ART

Recently, in order to satisfy the demand for higher recording density and downsizing in a hard disk drive (HDD) apparatus, higher sensitivity and larger output of a thin-film magnetic head is required. Thus, improvement in performance of a general giant magnetoresistive effect (GMR) head with a GMR read head element is now strenuously proceeding and also development of a tunnel magnetoresistive effect (TMR) head with a TMR read head element is energetically performed.

Because of the difference in flowing directions of their sense currents, structures of these TMR head and general GMR head differ from each other. One head structure in which the sense current flows in a direction parallel with surfaces of laminated layers as in the general GMR head is called as a current in plane (CIP) structure, whereas the other head structure in which the sense current flows in a direction perpendicular to surfaces of laminated layers as in the TMR head is called as a current perpendicular to plane (CPP) structure.

In recent years, CPP-GMR heads not CIP-GMR heads are being developed. For example, Japanese patent publication No. 05275769A, U.S. Pat. Nos. 5,341,118, 5,277,991 and 5,700,588 disclose such CPP-GMR heads.

Because the CPP structure utilizes magnetic shield layers themselves as electrodes, short-circuit or insufficient insulation between magnetic shield layers and element layers, which had been serious problem for narrowing the read gap in the CIP structure never inherently occurs. Therefore, the CPP structure lends itself to a high recording density head.

In recent, studied are CPP-GMR heads with spin valve magnetic multi-layered films including such as specular type magnetic multi-layered films or dual-spin valve type magnetic multi-layered films as in the case of the CIP-GMR heads.

Conventionally a lift-off method has been used for fabricating such CPP-GMR heads or TMR heads.

FIGS. 1a to 1h show plane views and sectional views illustrating a part of a conventional fabrication process of a TMR head by the lift-off method.

First, as shown in FIGS. 1a and 1b, a lower electrode and magnetic shield layer 10 is deposited on an insulation layer (not shown) formed on a substrate (not shown). Then, a lower metal layer 12", a lower ferromagnetic layer (pin layer and pinned layer) 13", a tunnel barrier layer 14", an upper ferromagnetic layer (free layer) 15" and an upper metal layer 16" that constitute a MR multi-layered film 11" are sequentially deposited thereon.

Then, a photo-resist pattern of two-layers structure is formed thereon, and the MR multi-layered film 11" is patterned by ion milling to obtain an MR multi-layered film 11'. Thereafter, an insulation layer and a hard magnetic layer (magnetic bias layer) are deposited thereon, and the photo-resist pattern is removed or lifted-off to obtain a patterned insulation layer 17 and a patterned hard magnetic layer 18 as shown in FIGS. 1c and 1d.

Then, a photo-resist pattern of two-layers structure is formed thereon, and the MR multi-layered film 11' is further patterned by ion milling to obtain an MR multi-layered structure 11 with a lower metal layer 12, a lower ferromagnetic layer (pin layer and pinned layer) 13, a tunnel barrier layer 14, an upper ferromagnetic layer (free layer) 15 and an upper metal layer 16. Thereafter, an insulation layer is deposited thereon by sputtering, and the photo-resist pattern is removed or lifted-off to obtain a patterned insulation layer 19 as shown in FIGS. 1e and 1f. It should be noted that FIG. 1e shows a C-C line section of FIG. 1f seen from a different direction as that of FIG. 1c that shows a B-B line section of FIG. 1d.

Then, an additional upper metal layer 20 and an upper electrode and magnetic shield layer 21 are deposited thereon as shown in FIGS. 1g and 1h.

FIGS. 2a to 2d show C-C line sectional views of FIG. 1f illustrating in detail the lift-off process for forming the patterned insulation layer 19. These figures indicate a region of the MR multi-layered structure opposite to that to be formed as an air bearing surface (ABS), in other words, these figures indicate a region that will not be removed by an MR-height adjusting process performed after the wafer process.

In this lift-off process, first, a two-layered photo-resist pattern 23 is formed on a surface-oxidized film 22 deposited on the MR multi-layered film 11' as shown in FIG. 2a.

Then, as shown in FIG. 2b, the MR multi-layered film 11' is patterned by ion milling to obtain the MR multi-layered structure 11. By this ion milling, a re-deposition 25 may be formed on a region A of an undercut 24, that is, under a canopy of the two-layered photo-resist pattern 23.

Then, as shown in FIG. 2c, an insulation layer 19' is deposited thereon by sputtering. By this sputtering, an overlapped part 19a of the insulation layer is formed on the re-deposition in the region of the undercut 24.

Thereafter, as shown in FIG. 2d, the two-layered photo-resist pattern 23 is removed and thus the lift-off process is completed.

Such lift-off process used for fabricating the conventional TMR head may cause to produce the overlapped part 19a of the insulation layer 19 in the region of the MR multi-layered structure 11 opposite to the ABS.

The re-deposition 25 and the overlapped part 19a are formed on the surface-oxidized film 22 within the region of the undercut 24 of the two-layered photo-resist pattern 23. The length of the undercut region A is determined at the forming of the two-layered photo-resist pattern 23 to 30-60 nm for example. If this length of the undercut region A is too small, unnecessary burr may occur around the removed photo-resist pattern when the insulation layer 19 is deposited and then lifted-off. In order to prevent the occurrence of unnecessary burr at the lift-off process therefore, it is necessary to form the undercut region A with a length of several tens nm. However, as aforementioned, within this undercut region A, the re-deposition 25 and the overlapped part 19a are surely formed on the surface-oxidized film 22 that is formed by exposure to the atmosphere.

Such overlapped part 19a will induce the following serious problems after the MR-height adjustment. Because the surface-oxidized film 22, the re-deposition 25 and the overlapped part 19a are formed in the region A, the electrical resistance in this region becomes very high. Also, because a target of the MR-height adjustment is decreased to 100 nm or less to satisfy the recent demand for higher recording density, the remaining region other than the region A, which keeps good electrical contact, becomes extremely narrow. Therefore, the serial resistance component of the MR head increases causing deterioration in the MR performance and in the frequency characteristics of the MR head.

The overlapped part 19a formed in the region A may be removed by as shown in FIG. 3a performing dry etching before the additional upper metal layer 20 and the upper electrode and magnetic shield layer 21 are deposited, and by simultaneously removing as shown in FIG. 3b all of the overlapped part 19a of the insulation layer 19 and a part of the upper metal layer 16. Thereafter, the additional upper metal layer 20 and the upper electrode and magnetic shield layer 21 are deposited as shown in FIG. 3c.

In order to completely remove the overlapped part 19a by such dry etching, it is necessary that the upper metal layer 16 has an enough thickness of about 10 nm or more. However, in case that the upper metal layer 16 is thick, it is difficult to form the upper ferromagnetic layer or free layer 15 with a narrow width when the MR multi-layered film 11' is patterned by ion milling. Thus, it is desired that the upper metal layer 16 is formed as thinner as possible. In other words, the upper metal layer 16 is necessary to make thin as for example 5 nm or less in order to form a narrow width free layer for increasing the recording density in the track direction. Contrary to this, in order to completely remove the overlapped part of the insulation layer, the upper metal layer 16 is necessary to make thick as for example 10 nm or more.

SUMMARY OF THE INVENTION

It is therefore an object of the present invention to provide a manufacturing method of a thin-film magnetic head and a thin-film magnetic head, whereby re-deposition and an overlapped part in the region of the MR multi-layered structure opposite to the ABS can be completely removed and also a width of a free layer can be narrowed.

According to the present invention, a manufacturing method of a thin-film magnetic head includes a step of depositing an MR multi-layered film on a lower electrode layer, a step of patterning the deposited MR multi-layered film to define a track width, a step of forming a layer containing at least first insulation layer at both track-width direction sides of the patterned MR multi-layered film, a step of depositing a first additional upper metal layer on the patterned MR multi-layered film and on the layer containing at least first insulation layer, a step of patterning the first additional upper metal layer and the MR multi-layered film to define a length in a direction perpendicular to the track-width direction so as to obtain an MR multi-layered structure, a step of forming a second insulation layer to surround the first additional upper metal layer and the MR multi-layered structure, a step of removing by etching the second insulation layer on the first additional upper metal layer formed on the MR multi-layered structure, a step of thereafter, forming a second additional upper metal layer on the first additional upper metal layer and on the second insulation layer, and a step of forming an upper electrode layer on the second additional upper metal layer.

It is preferred that the step of forming a layer containing at least first insulation layer includes forming the first insulation layer and the layer containing at least the first insulation layer by a lift-off process using a patterning mask for defining the track width of the MR multi-layered film.

It is also preferred that the step of forming a second insulation layer includes forming the second insulation layer by a lift-off process using a patterning mask for defining the length of the MR multi-layered film in a direction perpendicular to the track-width direction (MR-height direction length).

It is preferred that the MR multi-layered structure is a TMR multi-layered structure or a CPP-GMR multi-layered structure.

It is further preferred that the method further includes a step of forming many thin-film magnetic heads on a wafer, a step of cutting the wafer into a plurality of bars so that each bar has a plurality of thin-film magnetic heads aligned with each other, a step of lapping each bar, and a step of separating the lapped bar into a plurality of individual thin-film magnetic heads.

According to the present invention, furthermore, a thin-film magnetic head includes a lower electrode layer, an MR multi-layered structure formed on the lower electrode layer so that current flows in a direction perpendicular to surfaces of laminated layers, an insulation layer formed to surround the MR multi-layered structure, an additional upper metal layer laminated above at least the insulation layer and the MR multi-layered structure, and an upper electrode layer formed on the additional upper metal layer. A thickness T1 of a first part of the additional upper metal layer, formed on the insulation layer in a region opposite to an ABS, is thinner than a thickness T2 of a second part of the additional upper metal layer, formed at both track-width direction sides of the MR multi-layered structure.

It is preferred that the second part of the additional upper metal layer, formed at both track-width direction sides of the MR multi-layered structure, consists of a first additional upper metal layer and a second additional upper metal layer, and that the first part of the additional upper metal layer, formed on the insulation layer in a region opposite to the ABS, consists of only the second additional upper metal layer.

It is also preferred that the MR multi-layered structure is a TMR multi-layered structure or a CPP-GMR multi-layered structure.

Further objects and advantages of the present invention will be apparent from the following description of preferred embodiments of the invention as illustrated in the accompanying drawings.

BRIEF DESCRIPTION OF THE DRAWINGS

FIGS. 1a to 1h already disclosed show plane views and sectional views illustrating a part of a conventional fabrication process of a TMR head by a lift-off method;

FIGS. 4a to 4k show plane views and sectional views illustrating a part of process for fabricating a thin-film magnetic head wafer for TMR head as a preferred embodiment according to the present invention;

DESCRIPTION OF THE PREFERRED EMBODIMENTS

Figure 2A:
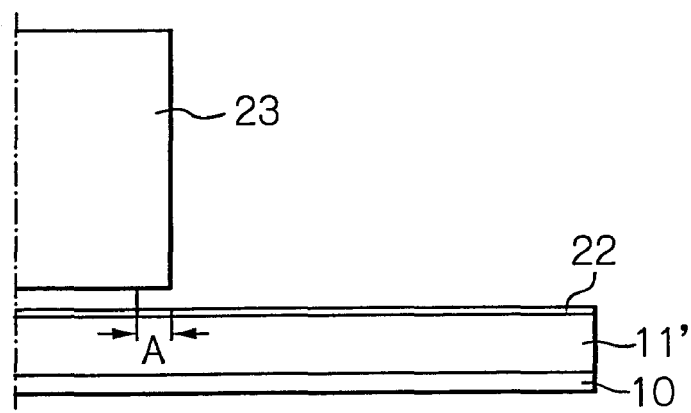
FIGS. 2a to 2d already disclosed show sectional views seen from C-C line of FIG. 1f illustrating in detail the lift-off process of an insulation layer.
Figure 2B:
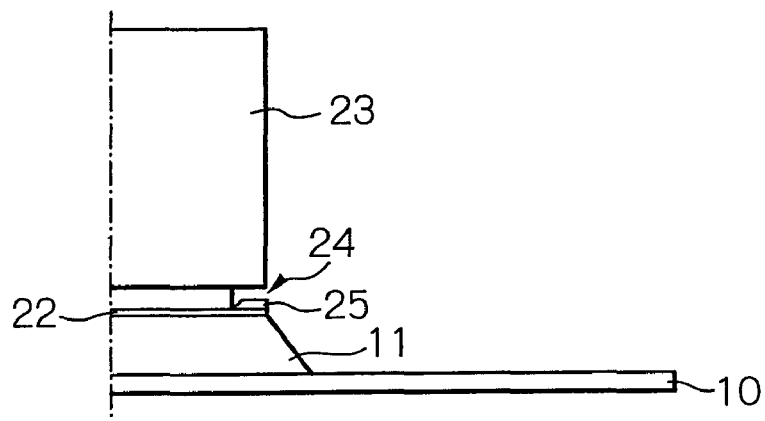
Figure 2C:
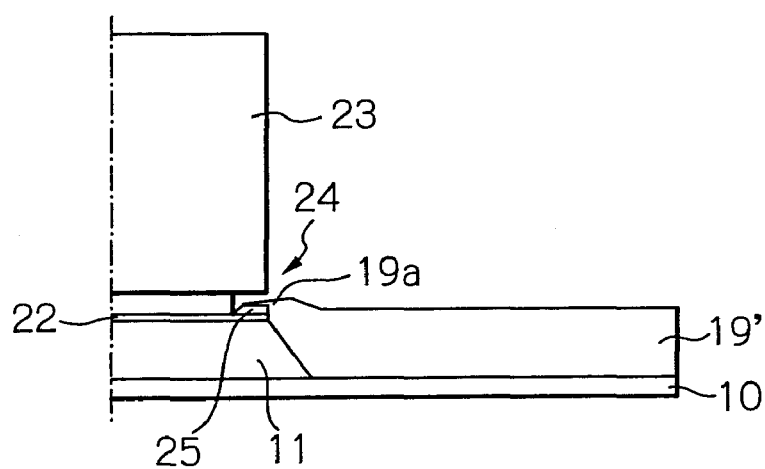
Figure 2D:
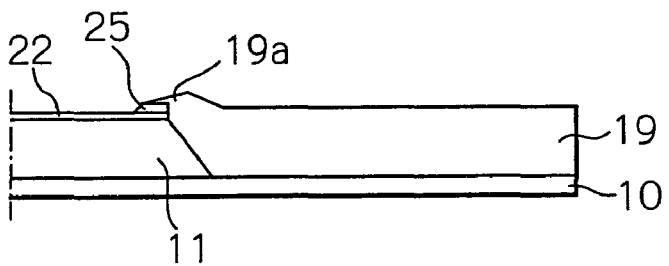
Figure 3A:
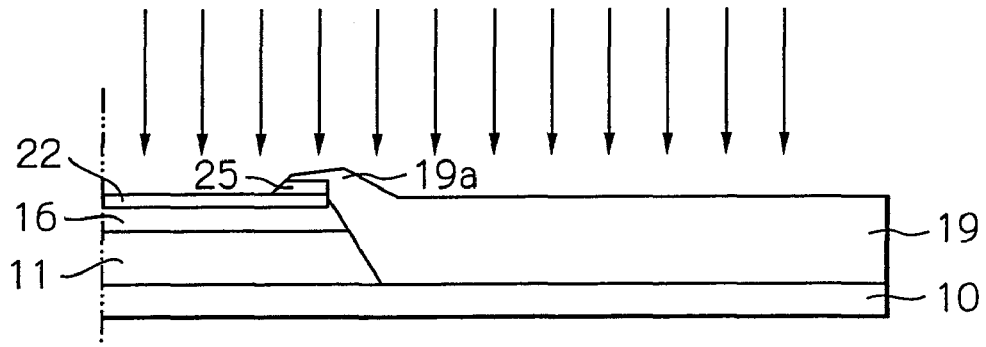
FIGS. 3a to 3c show sectional views illustrating a process of removing the overlapped part.
Figure 3B:
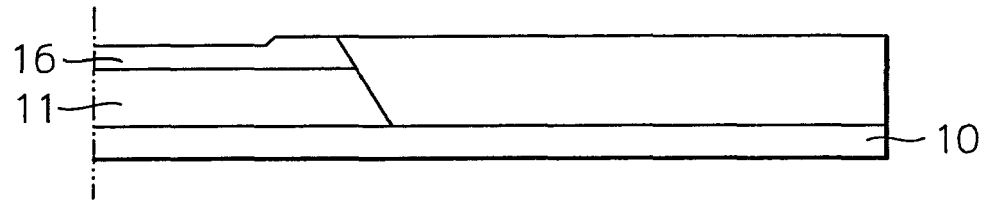
Figure 3C:
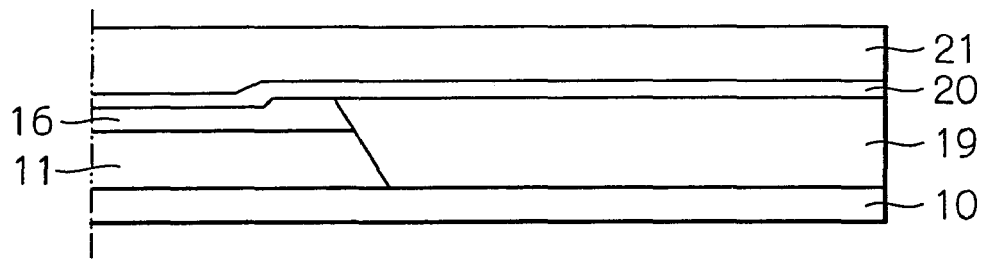

FIGS. 4a to 4j illustrate a part of process for fabricating a thin-film magnetic head wafer for TMR head as a preferred embodiment according to the present invention.

First, as shown in FIGS. 4a and 4b, a lower electrode layer 40 which also functions as a lower magnetic shield layer is deposited on an insulation layer (not shown) formed on a substrate (also not shown), and a MR multi-layered film 41" is deposited thereon. The MR multi-layered film 41" consists of a lower metal layer 42", lower ferromagnetic layers (pin layer and pinned layer) 43", a tunnel barrier layer 44", an upper ferromagnetic layer (free layer) 45" and an upper metal layer 46" sequentially laminated each other. In this case, the upper metal layer 46" is deposited as thinner than the conventional upper metal layer.

Then, a two-layered photo-resist pattern is formed thereon and the MR multi-layered film 41" is patterned by ion milling using the photo-resist pattern as a mask for defining a track width, so as to obtain a patterned MR multi-layered film 41'. In this case, because the upper metal layer 46" is thin, it is possible to narrow a width of the upper ferromagnetic layer or free layer 45". Then, an insulation layer and a hard magnetic layer or magnetic bias layer are deposited thereon and the photo-resist pattern is removed, namely the lift-off process is performed, so as to obtain an insulation layer 47 and a magnetic bias layer 48 as shown in FIGS. 4c and 4d.

Then, as shown in FIGS. 4e and 4f, a first additional upper metal layer 49' is deposited thereon by sputtering. Thus, the first additional upper metal layer 49' is deposited in a post process executed after the patterning process for defining the track width of the MR multi-layered film 41".

Thereafter, a photo-resist pattern is formed on the first additional upper metal layer 49', and then the MR multi-layered film 41' is patterned by ion milling using the photo-resist pattern as a mask for defining a length perpendicular to the track width (length along the MR height), so as to obtain an MR multi-layered structure 41 consisting of a lower metal layer 42, a lower ferromagnetic layer 43, a tunnel barrier layer 44, an upper ferromagnetic layer 45 and an upper metal layer 46, and a first additional upper metal layer 49 laminated thereon. Then, an insulation layer is deposited thereon and the photo-resist pattern is removed, namely the lift-off process is performed, so as to obtain an insulation layer 50 as shown in FIGS. 4g and 4h. It should be noted that FIG. 4g shows a C-C line section of FIG. 4h seen from a different direction as that of FIG. 4e that shows a B-B line section of FIG. 4f.

Then, all of the overlapped part 50a of the insulation layer 50, the re-deposition and the oxidized layer there under, and a part of the first upper metal layer 49 are simultaneously removed by dry etching. Thereafter, a second additional upper metal layer 51 and an upper electrode layer 52 which also functions as an upper magnetic shield layer are deposited thereon as shown in FIGS. 4i to 4k. It should be noted that FIG. 4i shows a C-C line section of FIG. 4k seen from a different direction as that of FIG. 4j that shows a B-B line section of FIG. 4k.

Instead of the simultaneous removing only by dry etching, the overlapped part 50a of the insulation layer 50 may be first removed by wet etching using a solvent that dissolve only the insulation layer 50 but never dissolves the additional upper metal layer 49, and then the re-deposition and the oxidized layer there under and a part of the first upper metal layer 49 may be removed by dry etching.

As shown in FIGS. 4i and 4j, only the second additional upper metal layer 51 is formed on the insulation layer 50 as the additional upper metal layer whereas both the first additional metal layer 49 and the second additional upper metal layer 51 are formed on the magnetic bias layer 48 as the additional upper metal layer. Therefore, a thickness T1 of the additional upper metal layer formed on the insulation layer 50 is thinner than a thickness T2 of the additional upper metal layer formed on the magnetic bias layer 48.

Typically, write head elements are fabricated on thus formed read head elements to complete a thin-film magnetic head wafer.

Figure 5A:
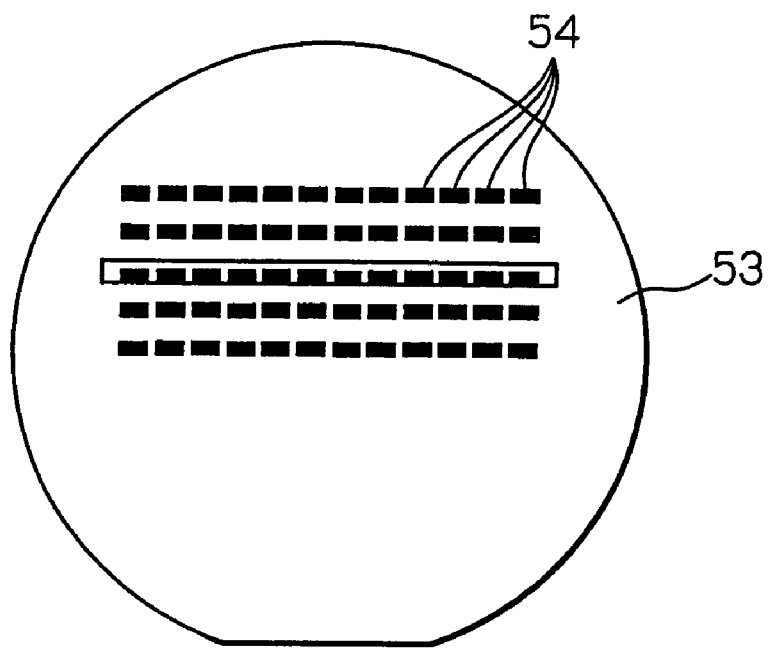
FIGS. 5a to 5c show plane views, oblique views and sectional views illustrating a part of process for obtaining bars from the fabricated thin-film magnetic head wafer and for adjusting MR height of each bar.
Figure 5B:
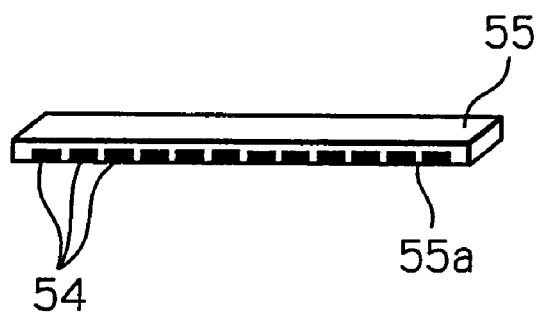
Figure 5C:
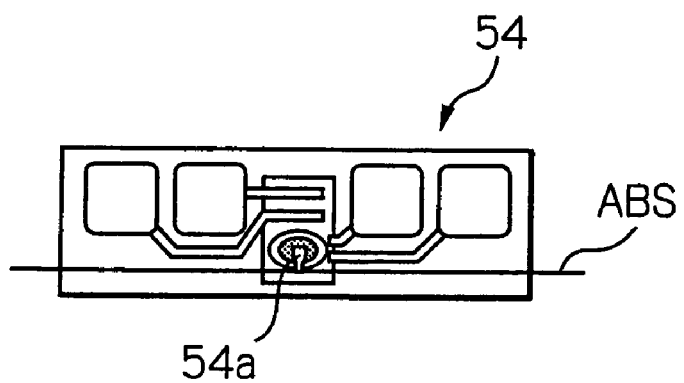

After the above-mentioned wafer process, a plurality of bars are obtained from the fabricated thin-film magnetic head wafer and MR height of each bar is adjusted. FIGS. 5a to 5c illustrate a part of this process for obtaining bars and for adjusting the MR height of each bar.

As shown in FIG. 5a, in the wafer process, many of thin-film magnetic heads are formed to arrange in matrix on an integration surface of the thin-film magnetic head wafer 53. The wafer 53 is then cut into a plurality of bars 55 so that each bar has a plurality of thin-film magnetic heads 54 aligned with each other as shown in FIG. 5b. Then, an ABS side surface 55a of each bar 55 is lapped to adjust the MR height. This MR height adjustment is executed until a magnetic head element section 54a of each thin-film magnetic head 54 exposes at the ABS as shown in FIG. 5c.

According to the aforementioned processes of the present invention, because the upper metal layer 46" is thin at the milling for defining the track width, it is possible to narrow the width of the free layer. Also, because not only the upper metal layer 46' but also the first additional upper metal layer 49' are laminated on the MR multi-layered structure when the overlapped part of the insulation layer and else in the region of the MR multi-layered structure opposite to the ABS are removed, the overlapped part can be completely removed without damaging the MR multi-layered structure.

Figure 6A:
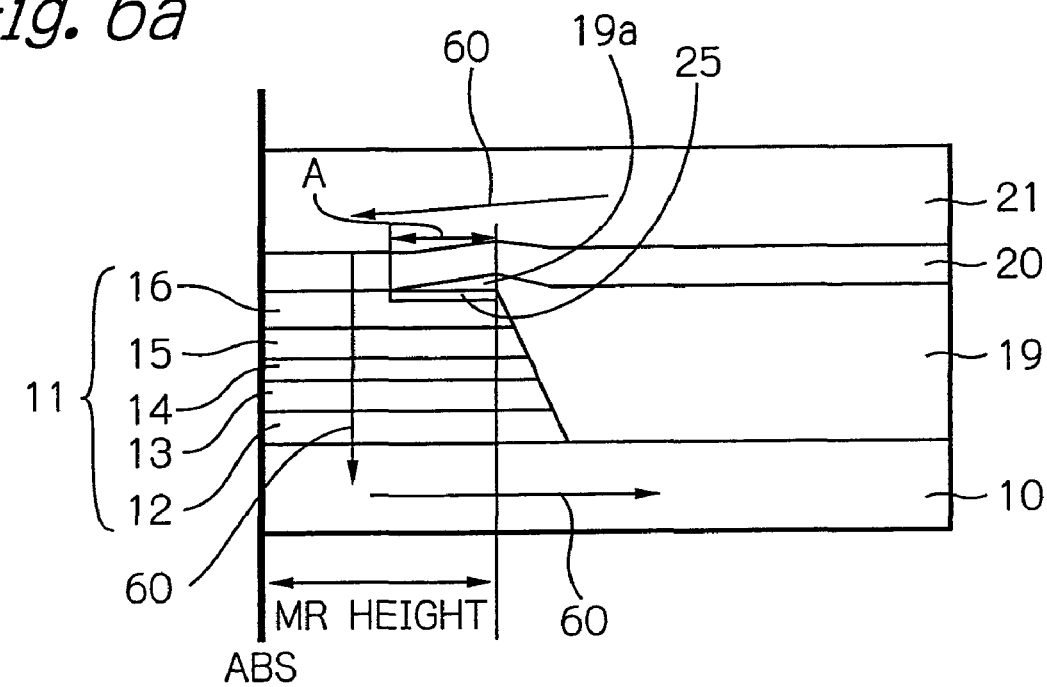
FIGS. 6a and 6b show sectional views illustrating difference in structure of the thin-film magnetic head fabricated by the conventional fabrication process using the lift-off method and of the thin-film magnetic head fabricated by the process of the embodiment shown in FIGS. 4a to 4j.
Figure 6B:
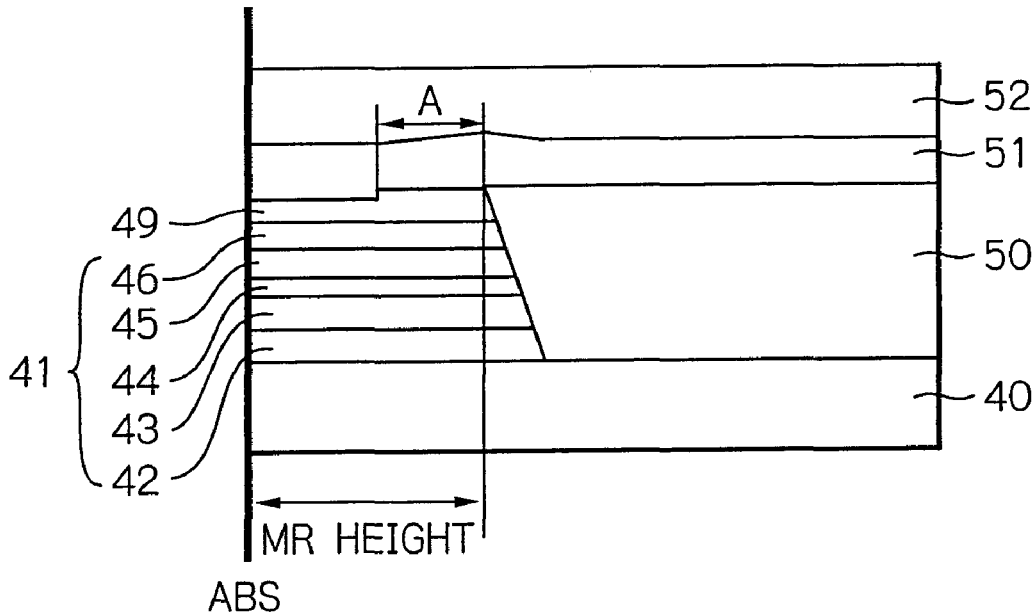

Furthermore, as shown in FIG. 6a, according to the conventional manufacturing method using the lift-off method, the oxidized film or re-deposition 25 and the overlapped part 19a are remained on the MR multi-layered structure 11 in the rear end region A opposite to the ABS causing the flow of current indicated by an arrow 60 in the figure to inhibit. However, according to the present invention, as shown in FIG. 6b, because the re-deposition and the overlapped part formed in the rear end region A of the MR multi-layered structure are completely removed, the head resistance can be reduced due to lowered sequential resistance component resulting both the MR performance and the frequency characteristics of the MR head to improve.

EXAMPLES

As for examples according to the conventional art, TMR heads were fabricated by the conventional manufacturing process shown in FIGS. 1a to 1h. Also, as for examples according to the present invention, TMR heads were fabricated by the manufacturing process shown in FIGS. 4a to 4k.

The layer structure of the conventional art examples was as follows. The lower electrode and magnetic shield layer 10 was NiFe with a thickness of about 2 μm, the lower metal layer 12 was Ta with a thickness of about 5 nm, the lower ferromagnetic layer 13 was multi-layers of NiFe with a thickness of about 2 nm, PtMn with a thickness of about 15 nm, CoFe with a thickness of about 2 nm, Ru with a thickness of about 0.8 nm and CoFe with a thickness of about 3 nm laminated in this order from the bottom, the tunnel barrier layer 14 was $Al_2O_3$ with a thickness of about 0.6 nm, the upper ferromagnetic layer 15 was multi-layers of CoFe with a thickness of about 1 nm and NiFe with a thickness of about 3 nm laminated in this order from the bottom, the upper metal layer 16 was Ta with a thickness of about 18 nm, the insulation layer 17 was $Al_2O_3$ with a thickness of about 5 nm, the hard magnetic layer 18 was multi-layers of CrTi with a thickness of about 5 nm, CoCrPt with a thickness of about 25 nm and Ta with a thickness of about 20 nm laminated in this order from the bottom, the insulation layer 19 was $Al_2O_3$ with a thickness of about 60 nm, the additional upper metal layer 20 was Ta with a thickness of about 5 nm, and the upper electrode and magnetic shield layer 21 was NiFe with a thickness of about 2 µm. The photo-resist pattern width for defining the track width was determined to about 80 nm.

The layer structure of the present invention examples was as follows. The lower electrode and magnetic shield layer 40 was NiFe with a thickness of about 2 µm, the lower metal layer 42 was Ta with a thickness of about 5 nm, the under layer was NiFe with a thickness of about 2 nm, the unti-ferromagnetic layer was PtMn with a thickness of about 15 nm, the lower ferromagnetic layer 43 was multi-layers of CoFe with a thickness of about 2 nm, Ru with a thickness of about 0.8 nm and CoFe with a thickness of about 3 nm laminated in this order from the bottom, the tunnel barrier layer 44 was $Al_2O_3$ with a thickness of about 0.6 nm, the upper ferromagnetic layer 45 was multi-layers of CoFe with a thickness of about 1 nm and NiFe with a thickness of about 3 nm laminated in this order from the bottom, the upper metal layer 46 was Ta with a thickness of about 5 nm, the insulation layer 47 was $Al_2O_3$ with a thickness of about 5 nm, the hard magnetic layer 48 was multi-layers of CrTi with a thickness of about 5 nm, CoCrPt with a thickness of about 25 nm and Ta with a thickness of about 20 nm laminated in this order from the bottom, the insulation layer 50 was $Al_2O_3$ with a thickness of about 60 nm, the first additional upper metal layer 49 was Ta with a thickness of about 16 nm, the second additional upper metal layer 51 was Ta with a thickness of about 5 nm, and the upper electrode and magnetic shield layer 52 was NiFe with a thickness of about 2 µm. The photo-resist pattern width for defining the track width was determined to about 110 nm.

On the TMR read head elements, write head elements were fabricated to complete a thin-film magnetic head wafer. Thereafter, the fabricated thin-film magnetic head wafer was cut into a plurality of bars, and MR height of each bar was adjusted to 0.1 µm by lapping using diamond particles. Then, a head protection layer of diamond like carbon (DLC) with 3 nm thickness was formed on the lapped surface of the bar, and the bar was cut into individual flying-type thin-film magnetic head samples. Reproduced outputs of the fabricated head samples were measured under the conditions, the flying height: 10 nm, the thickness of the protection layer of the recording medium: 3 nm, and the bias voltage: 150 mV. The measured results are shown in Table 1.

TABLE 1

|  | Width of Free Layer (optical width) (nm) | Effective Track Width (magnetic width) (nm) | Head Resistance (Ω) | S/N (dB) |
| --- | --- | --- | --- | --- |
| Conventional Art Example | 90 | 121 | 356 | 20.3 |
| Present Invention Example | 92 | 123 | 281 | 20.8 |

As will be noted from Table 1, although the photo-resist pattern width of the present invention example was 110 nm, which was very wider than that of the conventional art example of 80 nm, substantially the same width of free layer (optical width) and substantially the same width of effective track width (magnetic width, namely the actual width in practical use) were obtained in both examples. This is because the upper metal layer 46 was made thin as 5 nm thick and thus it was possible to mill the free layer to have the narrow free layer width. Therefore, the fabrication process of FIGS. 4a to 4k can save the accuracy and controllability of the photo process device and thus can provide high mass productivity.

Also, in comparison with the conventional art example, the present invention example has lower head resistance and improved signal to noise ratio (S/N). This can be assumed that the overlapped part of the insulation layer was completely removed and therefore unnecessary DC resistance component was eliminated.

As aforementioned, according to the present invention, the photo-resist pattern width can be widen to obtain the same free layer width with respect to the conventional art. Also, because the overlapped part of the insulation layer in the region of the MR multi-layered structure opposite to the ABS can be completely removed, it is possible to more improve S/N.

In the above-mentioned embodiments and examples, the magnetic bias layers are formed at both track-width direction sides of the MR multi-layered structure. However, the present invention is applicable to a thin-film magnetic head with the structure in which the magnetic bias layer is formed to laminate on the free layer of the MR multi-layered structure.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A manufacturing method of a thin-film magnetic head, comprising:

depositing a magnetoresistive effect multi-layered film on a lower electrode layer;

patterning the deposited magnetoresistive effect multi-layered film to define a track width;

forming a layer comprising at least first insulation layer at both track-width direction sides of the patterned magnetoresistive effect multi-layered film;

depositing a first additional upper metal layer on the patterned magnetoresistive effect multi-layered film and on said layer comprising at least first insulation layer;

patterning said first additional upper metal layer and said magnetoresistive effect multi-layered film to define a length in a direction perpendicular to the track-width direction so as to obtain a magnetoresistive effect multi-layered structure;

forming a second insulation layer to surround said first additional upper metal layer and said magnetoresistive effect multi-layered structure;

removing by etching the second insulation layer on the first additional upper metal layer formed on said magnetoresistive effect multi-layered structure;

thereafter, forming a second additional upper metal layer on said first additional upper metal layer and on said second insulation layer; and forming an upper electrode layer on said second additional upper metal layer.

2. The manufacturing method as claimed in claim 1, wherein said step of forming a layer comprising at least first insulation layer comprises forming said first insulation layer and said layer comprising at least the first insulation layer by a lift-off process using a patterning mask for defining the track width of said magnetoresistive effect multi-layered film.

3. The manufacturing method as claimed in claim 1, wherein said step of forming a second insulation layer comprises forming said second insulation layer by a lift-off process using a patterning mask for defining the length of said magnetoresistive effect multi-layered film in a direction perpendicular to the track-width direction.

4. The manufacturing method as claimed in claim 1, wherein said magnetoresistive effect multi-layered structure is a tunnel magnetoresistive effect multi-layered structure.

5. The manufacturing method as claimed in claim 1, wherein said magnetoresistive effect multi-layered structure is a current perpendicular to plane type giant magnetoresistive effect multi-layered structure.

6. The manufacturing method as claimed in claim 1, wherein said method further comprises:
   forming many thin-film magnetic heads on a wafer,
   cutting the wafer into a plurality of bars so that each bar has a plurality of thin-film magnetic heads aligned with each other,
   lapping each bar, and
   separating the lapped bar into a plurality of individual thin-film magnetic heads.

* * * * *